March 28, 1950     H. LORENZ ET AL     2,501,906
COMBINE PICKUP CLEANER
Filed Oct. 25, 1945     3 Sheets-Sheet 1
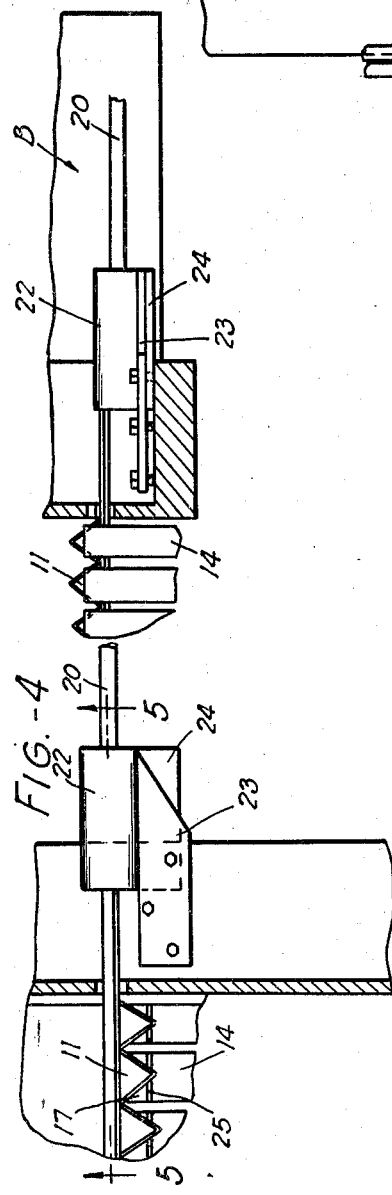
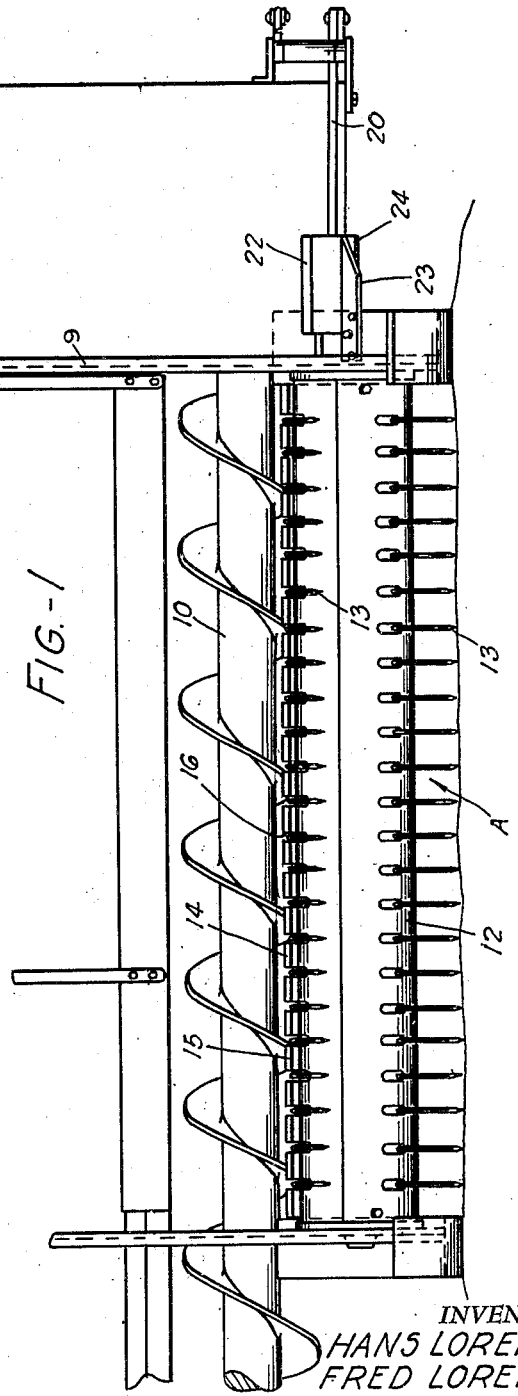
INVENTOR.
HANS LORENZ
FRED LORENZ
BY Victor J. Evans & Co.
ATTORNEYS March 28, 1950     H. LORENZ ET AL     2,501,906
COMBINE PICKUP CLEANER
Filed Oct. 25, 1945     3 Sheets-Sheet 2
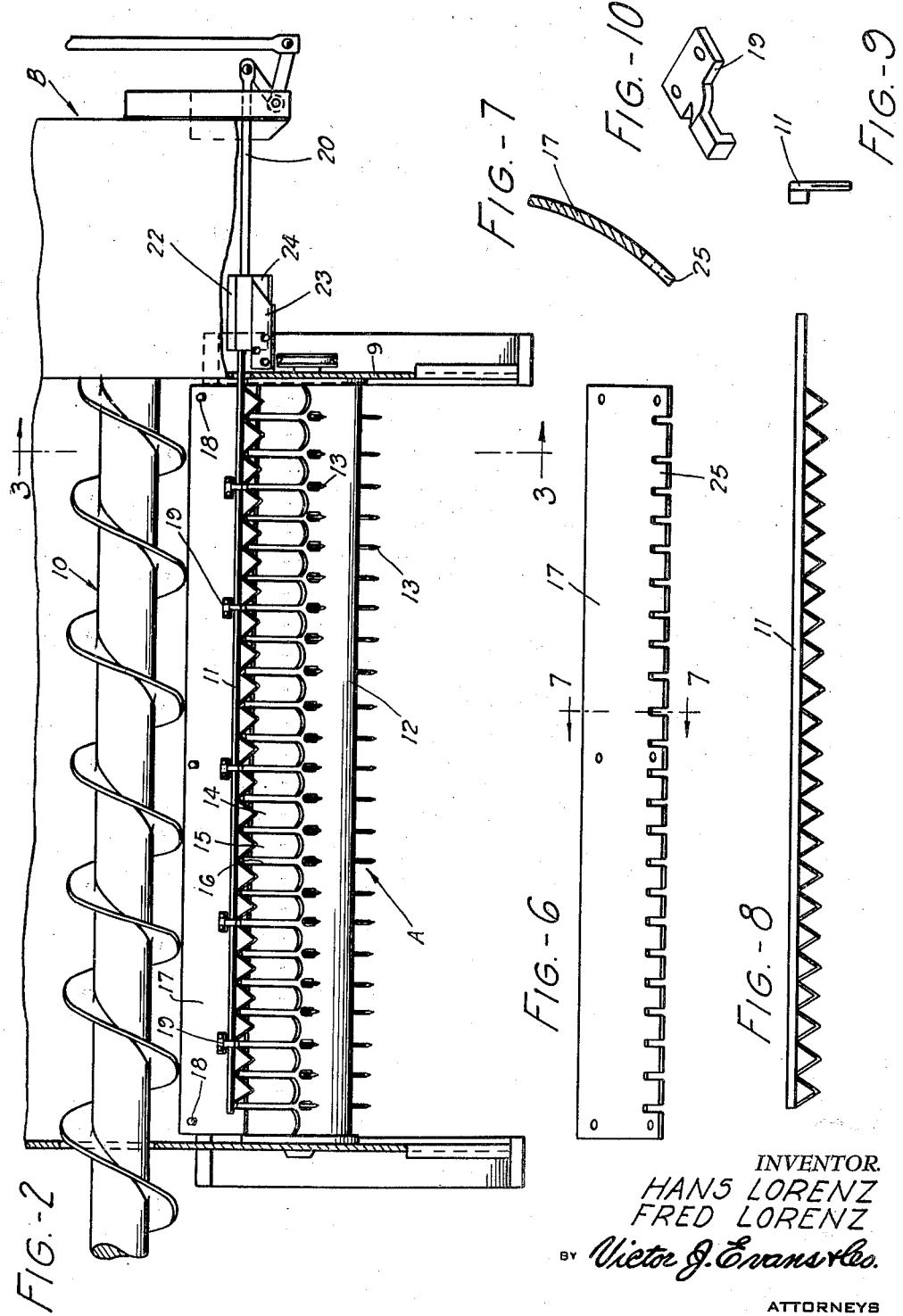
INVENTOR.
HANS LORENZ
FRED LORENZ
BY *Victor J. Evans & Co.*
ATTORNEYS

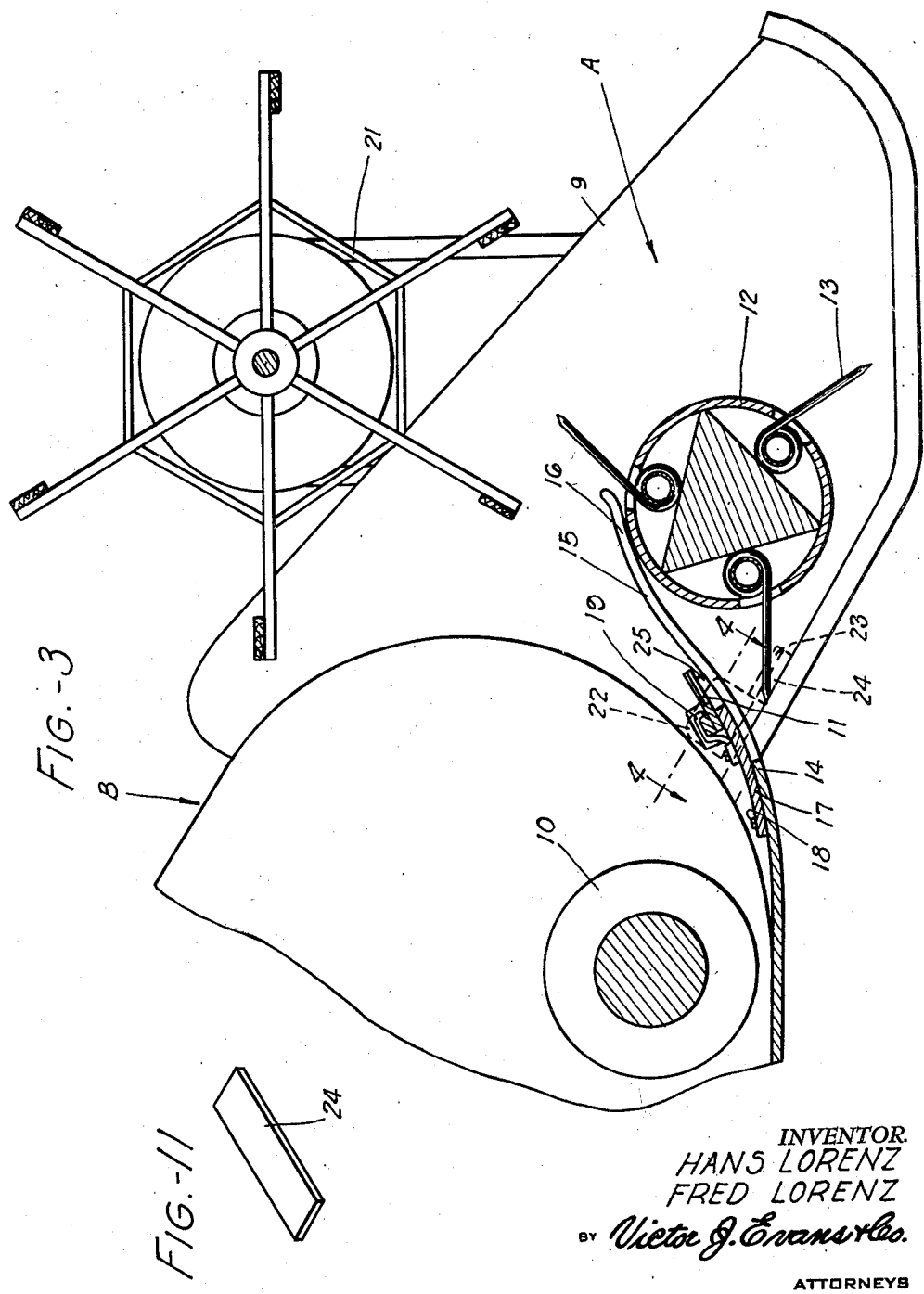

Patented Mar. 28, 1950

2,501,906

UNITED STATES PATENT OFFICE 2,501,906

COMBINE PICKUP CLEANER

Hans Lorenz and Fred Lorenz, Esmond, S. Dak.

Application October 25, 1945, Serial No. 624,400

1 Claim. (Cl. 56—364)

The invention relates to a combine pick-up attachment, and more especially to a cleaner attachment for use on a combine pick-up mechanism.

The primary object of the invention is the provision of an attachment of this character, wherein the pick-up mechanism of a combine is relieved from choking and is automatically cleaned irrespective of the condition of the grain, whether ripened, tough, matted, weathered or otherwise in a poor condition infested with plant growths, as creeping jenny, buckwheat, weeds, sunflowers or other waste.

Another object of the invention is the provision of an attachment of this character, wherein its assembly enables the use thereof on any and all well known types of combines having the pick-up mechanism, the attachment being novel in construction and unique in the assembly of its parts, as the grain material will be carried directly over the drum, drum cover and into the auger of the combine, without matting or piling up action.

A further object of the invention is the provision of an attachment of this character, wherein the platform is maintained clean and there is no piling up of tough straw, this being had by a sickle, a plate and the arrangement for operating the sickle or cutting bar, as the latter keeps moving and cutting, thus eliminating the grain becoming matted or forming a block to other incoming straw and grain.

A still further object of the invention is the provision of an attachment of this character, which is simple in construction, thoroughly reliable and efficient in operation, strong, durable, automatic in the working thereof, and inexpensive to manufacture and install.

With these and other objects in view the invention consists in the features of construction, combination and arrangement of parts as will be hereinafter more fully described, illustrated in the accompanying drawings, which show the preferred embodiment of the invention, and pointed out in the claim hereunto appended.

In the accompanying drawings—

Figure 1 is a fragmentary elevation of a combine pick-up showing the attachment constructed in acordance with the invention applied.

Figure 2 is a top plan view partly in section.

Figure 3 is an enlarged sectional view taken approximately on the line 3—3 of Figure 2 looking in the direction of the arrows and showing additional parts of the combine.

Figure 4 is a fragmentary sectional view taken on the line 4—4 of Figure 3 looking in the direction of the arrows.

Figure 5 is a fragmentary sectional view taken on the line 5—5 of Figure 4 looking in the direction of the arrows.

Figure 6 is a plan view of the cleaner element.

Figure 7 is an enlarged sectional view taken on the line 7—7 of Figure 6 looking in the direction of the arrows.

Figure 8 is a plan view of the sickle.

Figure 9 is an end view of Figure 8.

Figure 10 is an enlarged perspective view of an element of the invention.

Figure 11 is a perspective view of one end piece for the sickle bed.

Similar reference characters indicate corresponding parts throughout the several views in the drawings.

Referring to the drawings in detail, A designates generally a pick-up attachment as applied to a "combine" although it is applicable to a binder or other similar machinery, in which the grain crop is to be deposited on a conveyor or the like, and in this instance the combine involves a header, a portion being denoted at B having an auger 10, and a sickle or cutter bar 11, the former collecting the cut material and conveying it to a raddle or other suitable conveyor, not shown, by which it is transmitted to the threshing mechanism, which also is not shown as it forms no part of the present invention.

The pick-up mechanism A comprises a rotary cylinder 12 having a plurality of yieldably mounted pick-up fingers 13 projecting from the cylinder and in this instance inclined backwardly with relation to the direction of rotation of the said cylinder, which moves in a counterclockwise direction as viewed in Figure 3, as the machine is advanced to have the material in a windrow raised by the fingers and carried over the cylinder. Any material in contact with the cylinder 12 encounters a slotted stripper plate 14 which is curved in a close and partially overhanging position with respect to such cylinder, so as to urge the material along the length of the fingers 13 toward and off the ends thereof without any tendency toward catching or pinching material between the plate and fingers due to the movement of the fingers.

Superimposed on this stripper plate 14 and partially overlying the innermost ends of the tines 15 thereof created by the slots 16 therebetween is a comb tooth-like cleaner bar or plate 17, which is made secure by fasteners 18 to the said stripper plate, and upon such bar or plate are secured at intervals longitudinally thereof a series of sickle or cutter bar guides 19, in which reciprocates the sickle or cutter bar 11, as best seen in Figure 2 of the drawings.

The sickle or cutter bar 11 is operated by a pitman connection 20 actuated in suitable or well known manner, not shown.

The drive for the cylinder 12 may be effected in any suitable manner, and inasmuch as the sickle or cutting element normally on the harvester portion of the combine is not used while the pick-up is in operation and the drive thereto is disconnected therefrom. The drive for the cylinder 12 is taken from the mechanism already on the combine for driving the sickle.

A sickle or cutter bar head 22 is carried by a bracket 23 provided with a reinforcement member 24 which is affixed to the underside thereof. The bracket is affixed to a shoe 9 forming a part of the pick-up mechanism.

The cleaner bar or plate 17 functions for keeping the cylinder and sickle or cutter bar cleaned at all times, and allows the fingers 13 to carry the grain directly over the cylinder and into the auger 10, without matting or pile-up irrespective of the condition of the grain, whether varying in degrees of ripeness, toughness, matted, weathered, and generally in a very poor condition for pick-up. Also it is possible to pick up grain infested with such plant growths as creeping jenny, buckwheat, weeds and sunflowers. The sickle or cutter bar 11, which runs continuously, cuts the matted grain into proper proportions, so that it runs back into the auger and is carried into the combine itself for threshing. The sickle or cutter bar itself is not, however, sufficient to handle the situation and for this reason it is necessary to have the bar or plate 17 with its comb teeth 25 related to such sickle or cutter bar, and in this manner keeps the platform clean and there is no piling up of tough straw, the straw moving smoothly from the ground around and over the cylinder, and into the auger, the sickle or cutter being active for keeping the grain cut and from becoming matted or forming a block to other incoming straw and grain.

What is claimed is:

In an attachment for a combine pick-up cleaner having a rotary cylinder with spaced pick-up fingers, an auger, a cutter bar, and a stripper plate having arcuate tines extended upwardly with the ends of the tines resting upon the cylinder, the combination which comprises an arcuate cleaner bar having comb teeth separated by slots in the leading edge with the said comb teeth corresponding with the tines of the stripper plate and with the slots between the comb teeth extended inwardly a short distance from the said leading edge and covering portions of the slots between the said tines of the stripper plate, and means mounting the said cutter bar on said cleaner bar.

HANS LORENZ.
FRED LORENZ.

REFERENCES CITED

The following references are of record in the file of this patent:

UNITED STATES PATENTS

| Number | Name | Date |
|---|---|---|
| 2,324,261 | Krause | July 13, 1943 |